US010789516B2

(12) United States Patent
Masselus et al.

(10) Patent No.: US 10,789,516 B2
(45) Date of Patent: Sep. 29, 2020

(54) METHOD FOR PRODUCING CENTER SCAN IMAGE OUTPUT USING AN OVER SCAN RIP TECHNIQUE TO GENERATE AN OUTPUT BITMAP IMAGE PIXEL VALUES

(71) Applicant: ESKO Software BVBA, Ghent (BE)

(72) Inventors: Vincent Masselus, Oostakker (BE); Martin Taylor, Stroud Gloucestershire (GB)

(73) Assignee: ESKO Software BVBA, Ghent (BE)

( * ) Notice: Subject to any disclaimer, the term of this patent is extended or adjusted under 35 U.S.C. 154(b) by 0 days.

(21) Appl. No.: 16/315,310

(22) PCT Filed: Jul. 6, 2017

(86) PCT No.: PCT/EP2017/066969
§ 371 (c)(1),
(2) Date: Jan. 4, 2019

(87) PCT Pub. No.: WO2018/007539
PCT Pub. Date: Jan. 11, 2018

(65) Prior Publication Data
US 2019/0213454 A1 Jul. 11, 2019

Related U.S. Application Data

(60) Provisional application No. 62/359,343, filed on Jul. 7, 2016.

(51) Int. Cl.
G06K 15/02 (2006.01)
H04N 1/387 (2006.01)
G06K 9/36 (2006.01)

(52) U.S. Cl.
CPC ....... G06K 15/184 (2013.01); G06K 15/1842 (2013.01); G06K 15/1843 (2013.01);
(Continued)

(58) Field of Classification Search
None
See application file for complete search history.

(56) References Cited

U.S. PATENT DOCUMENTS 4,908,780 A 3/1990 Priem et al.
5,729,634 A 3/1998 Robinson
(Continued)

OTHER PUBLICATIONS

International Search Report issued in PCT/EP2017/066969 dated Sep. 8, 2017, 4 pages.
(Continued)

Primary Examiner — Benny Q Tieu
Assistant Examiner — Haris Sabah
(74) Attorney, Agent, or Firm — RatnerPrestia

(57) ABSTRACT

A raster image processing system including a computer readable media storing digital information that includes information corresponding to an image, and instructions for performing raster image processing (RIP) using an over scan RIP technique on the image to generate a bitmap. Also included is a processor configured to RIP the image using the over scan RIP technique at a multiple of the desired output pixel resolution to produce a plurality of sub-pixels per output pixel. The processor is further configured to determine each image output pixel value based on the values set for the plurality of sub-pixels of each image pixel, by firstly comparing the values of the plurality of sub-pixels to each other and, and then secondly comparing the values of the plurality of sub-pixels to a set background value if needed. The processor then sets the output pixel value based upon that second comparison, and generates a bitmap.

26 Claims, 9 Drawing Sheets

(52) U.S. Cl.
CPC ..... *G06K 15/1844* (2013.01); *G06K 15/1873* (2013.01); *G06K 9/36* (2013.01); *G06K 2215/006* (2013.01); *H04N 1/387* (2013.01)

(56) References Cited

U.S. PATENT DOCUMENTS

2010/0128314 A1   5/2010   Loce et al.
2011/0222127 A1   9/2011   Loce et al.

OTHER PUBLICATIONS

Written Opinion of the International Searching Authority issued in PCT/EP2017/066969 dated Sep. 8, 2017, 7 pages.
International Preliminary Report on Patentability and Written Opinion issued in International Application No. PCT/EP2017/066969, dated Jan. 8, 2019, 8 pages.

FORMULA:
Cada frasco ampolla con 10 ㎖
de solución inyectable contier
Citarabina                    50C
Excipientes: ácido láctico, lac
agua para inyectables.
Manténgase fuera del alcanc
Almacenar en lugar fresco a ℓ
Para un solo uso: descarte el
Registro I.S.P. N° F-7182
Fabricado por
Ebewe Pharma Ges.m.b.H. ℕ
Mondseestr. 11 A-4866 Unter
Importado y distribuido en Ch

302
OVER SCAN
OUTPUT OF
TEXT FILE

FORMULA:
Cada frasco ampolla con 10 ㎖
de solución inyectable contier
Citarabina                    50C
Excipientes: ácido láctico, lac
agua para inyectables.
Manténgase fuera del alcanc
Almacenar en lugar fresco a ℓ
Para un solo uso: descarte el
Registro I.S.P. N° F-7182
Fabricado por
Ebewe Pharma Ges.m.b.H. ℕ
Mondseestr. 11 A-4866 Unter
Importado y distribuido en Ch

300
CENTER SCAN
OUTPUT OF
TEXT FILE

METHOD FOR PRODUCING CENTER SCAN IMAGE OUTPUT USING AN OVER SCAN RIP TECHNIQUE TO GENERATE AN OUTPUT BITMAP IMAGE PIXEL VALUES

This application is the U.S. National Phase Application of PCT/EP2017/066969, filed Jul. 6, 2017, which claims the benefit of priority of U.S. Provisional Application No. 62/359,343, entitled METHOD FOR PRODUCING CENTER SCAN IMAGE OUTPUT USING AN OVER SCAN RIP, filed on 7 Jul. 2016, the contents of which are incorporated herein by reference in their entirety for all purposes.

FIELD

This invention relates generally to a method of producing center scan image output results when using over scan RIP techniques.

BACKGROUND

In general a Raster Image Processor (RIP) is a device that translates PostScript and other page-description language commands (vector data) into pixels or dots (bitmap data) for printing by a dot matrix, inkjet, or laser printer, or by an imagesetter. RIP software comprises instructions readable by a machine, such as a computer, for carrying out such a translation. The act of such translation, Raster Image Processing, is also often referred to as a RIP. Two conventional methods for conducting a RIP include center scan RIP and over scan RIP. In general, RIP processing can be conceptualized as a grid of pixels that overlaps the image in the digital file. If a particular pixel in the grid overlaps a portion of the image, that overlap would require the output pixel to be filled, and the output bitmap is provided with data that will be interpreted by the rastering output device to fill that pixel (e.g. apply a dot of ink or illuminate a pixel on a screen). An over scan RIP will fill all pixels whose bounding box intersects the path of an image feature, regardless of the size of the intersection. A center scan RIP will fill an output pixel only when the center of the pixel lies inside the path.

Conventional RIP software used in the printing industry is typically programmed to perform over scan RIP. However, the output of an over scan RIP (i.e. the resultant bitmap) has a tendency to fill too many pixels, which creates a heavier looking output on the edges of objects within the image. For example, in line art (e.g. text documents) which typically have fine detail, the lines (e.g. text) can look fat and less appealing. At lower resolutions, some details can even be lost, resulting in unreadable text. Thus, although over scan RIP is widely used in conventional RIP software, it can produce unwanted results, and reprogramming printing devices to utilize center scan RIP software is generally not a feasible, or optimal solution.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 shows a comparison view of a text file output when performing center scan RIP and over scan RIP.

SUMMARY

Figure 1:
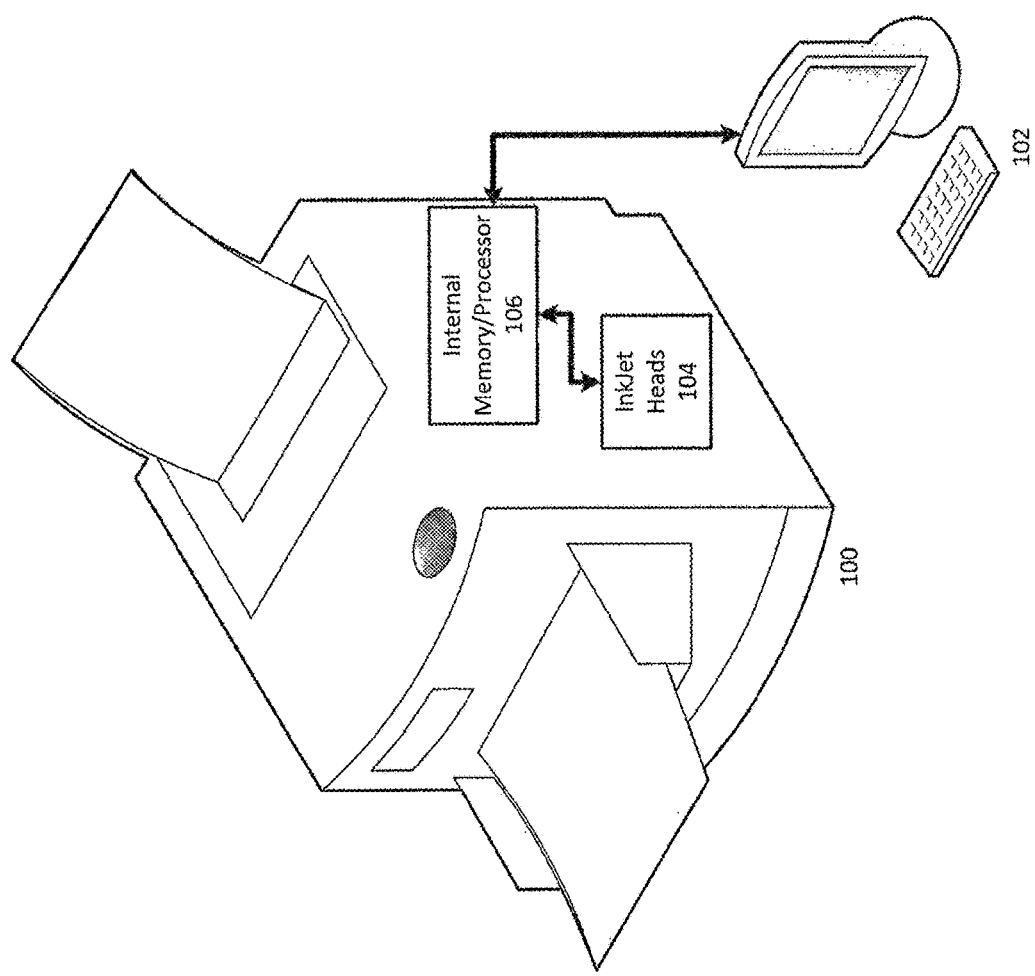
FIG. 1 shows a schematic representation of an exemplary printing device connected to a computer.

One embodiment includes a raster image processing system comprising a computer readable media storing digital information. The digital information including information corresponding to an image, and instructions for performing raster image processing (RIP) using an over scan RIP technique on the image to generate a bitmap. A processor of the system is configured to access the stored digital information to retrieve the information corresponding to the image and the instructions for performing the RIP, and RIP the image using the over scan RIP technique at a multiple of the desired output pixel resolution to produce a plurality of sub-pixels per output pixel. Each sub-pixel having a value set by the over scan RIP technique. The processor is further configured to determine each image output pixel value based on the values set for the plurality of sub-pixels of each image pixel, by first comparing the values of the plurality of sub-pixels to each other and, if that first comparison indicates further processing is necessary, secondly comparing the values of the plurality of sub-pixels to a set background value, and setting the output pixel value based upon that second comparison, and generate the bitmap comprising the output image pixel values.

One embodiment includes a raster image processing method comprising the steps of accessing, by a processor, digital information stored on a computer readable media to retrieve information corresponding to an image and instructions for performing raster image processing (RIP) using an over scan RIP technique on the image to generate a bitmap, and RIPing, by the processor, the image using the over scan RIP technique at a multiple of the desired output pixel resolution to produce a plurality of sub-pixels per output pixel. Each sub-pixel having a value set by the over scan RIP technique, The method steps also including determining, by the processor, each image output pixel value based on the values set for the plurality of sub-pixels of each image pixel, by firstly comparing the values of the plurality of sub-pixels to each other and, if that first comparison indicates further processing is necessary, secondly comparing the values of the plurality of sub-pixels to a set background value, and setting the output pixel value based upon that second comparison; and generating, by the processor, the bitmap comprising the output image pixel values.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

One aspect of the invention is aimed at producing a center scan RIP output for printing when using an over scan raster image processing (RIP) technique. An exemplary process includes RIPing images at twice or more the regular resolution to produce sub-pixels within each master pixel. Over scan techniques are then performed on each sub-pixel within the image. Turning an output pixel on or off may depend on the number of sub-pixels, the intensity value of the sub-pixels selected during the over scan process, and a detected background value of the image. This process results in a desirable center scan RIP output even though over scan RIP is actually being performed.

Shown in FIG. 1 is an exemplary printer system including ink jet printer 100 and computer 102 which are connected to each other via wire or wirelessly. The printer 100 includes internal devices such as internal memory/processors 106 and ink jet heads 104 which ultimately perform the printing process on the printing medium (e.g. paper). Although illustrated schematically with respect to a computer and a printer, it should be understood that the process disclosed herein may be used in connection with generating any type of output representative of an image on a rastering device, including in the form of a computer file containing instructions for generating the image using any type of output rastering device. Thus, the output generated by the methods disclosed herein may be suitable for use by, for example, an imagesetter used in commercial computer-to-plate environments in which images are applied to a print medium using any type of printing process known in the art, such as but not limited to flexographic printing processes, or the output may be an output viewable on a screen, such as but not limited to a proofing device. In addition, the output generated by the methods disclosed herein may be particularly well suited for use in connection with digital presses. Accordingly, the reference to a commonly understood computer and attached printer is for simplicity of illustration only, and is not intended to be limiting in any way.

During operation, the user (not shown) of computer 102 may desire to output a digital file using a rastering device, such as a printer or a video screen. This digital file may comprise one or more native formats, such as portable document format (PDF), joint photographic experts group (PEG), text file format (WORD), etc. Prior to printing or other output on a rastering device, this digital file is translated from its original format to a bitmap format by performing a RIP operation. The resolution of the digital file (e.g. the number of pixels per unit area) may be different than the resolution required for the output device, or in the case of data stored in the digital file in a vector format (such as most modern font rendering software used for displaying text), the vector data must be converted to rasterized data in the form of a bitmap. This resultant bitmap may then be utilized by internal memory/processor 106 of a rastering device, such as ink jet printer 100 to control ink jet heads 104 to print the text document onto the medium.

As noted above, two basic techniques for performing a RIP on digital image files to convert the digital image files into bitmaps are over scan RIP and center scan RIP. In a center scan RIP process, the image must overlap the center of the output pixel for the output pixel to be filled. In an over scan RIP, the pixel is filled if the image overlaps any portion of the output pixel (i.e. not just the center).

Figure 2:
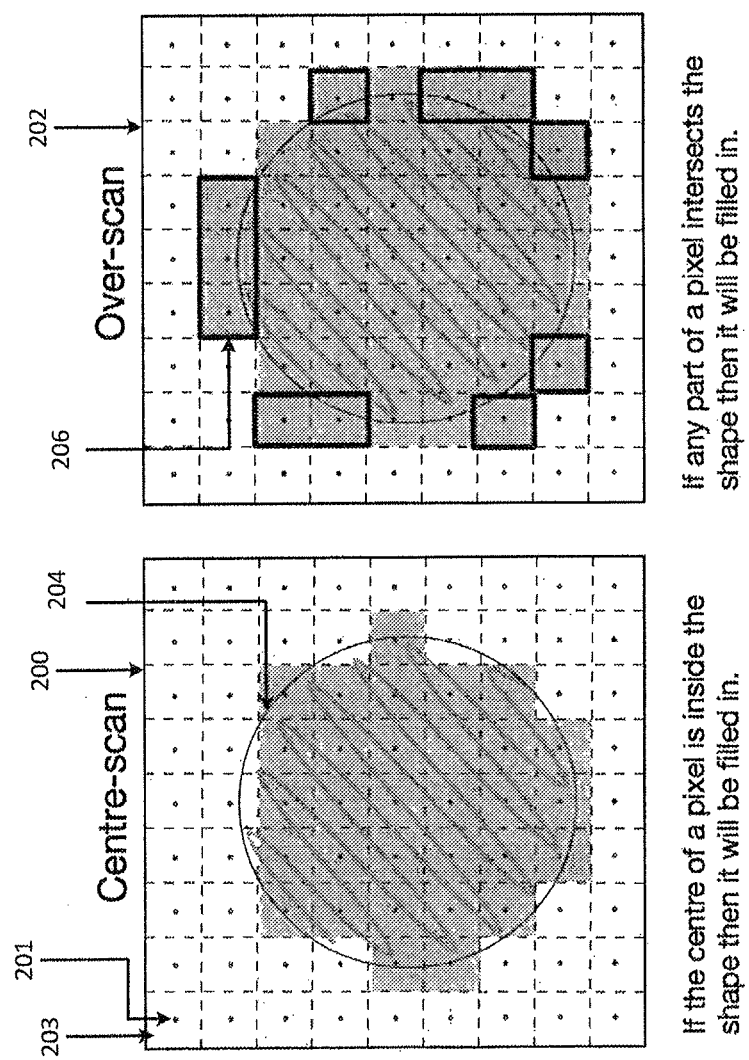
FIG. 2 shows a comparison view of output pixels when performing center scan RIP and over scan RIP relative to a circular image shape.

A comparison between center scan RIP and over scan RIP outputs is shown in the example of FIG. 2. As shown in FIG. 2, the output of a center scan RIP for a circular image feature 204 is shown by the shaded output pixels in grid 200, whereas the output of an over scan RIP to the circular image feature 204 is shown by the shaded output pixels in grid 202. It should be noted that the various "dots" 201 centered in the individual pixels 203 in FIG. 2 indicate the center of the respective pixels.

In center scan example 200, the center (i.e. dot 201) of each pixel 203 must be covered by the image shape for the corresponding output pixel to be filled. This is shown in 200 where only the pixels that have their center dots located within the circle are filled (i.e., pixels having center dots outside the circle are not illuminated). In contrast, in over scan scenario 202, the circular shape only has to touch a portion of the pixel 203 for the output pixels to be illuminated (i.e., the center dot of the pixel does not have to be within the circle). This results in significantly more pixels (specifically, pixels 206 highlighted in dark outlines) being filled in over scan RIP output 202 as compared to the center scan RIP output 200. Thus, the output bitmap for over scan RIP is different than the output bitmap for center scan RIP.

Because over scan RIP is not restricted to filling pixels only when their centers are covered, there is a tendency to fill too many pixels in the image, which creates a heavier looking output on the edges of image objects. For example, as shown in FIG. 3, performing over scan RIP on a text document may result in over scan output 302 with lines (e.g., text) that look fatter and more blurry then center scan output 300. Thus, performing center scan RIP on a text file, typically results in output 300 with finer details (e.g. crisper text) that is more appealing to the eye and easier to read.

Although center scan techniques may produce better results and may be favored in certain applications, many state of the art RIPs do not utilize a center scan RIP algorithm. Many such devices typically use (i.e. are programmed to use) over scan RIP techniques. Because it is generally not feasible to reprogram such RIPs to use center scan techniques, there is a need in the art for an algorithm that can utilize an over scan RIP to realize results comparable to results achievable using center scan RIP techniques.

Figure 4:
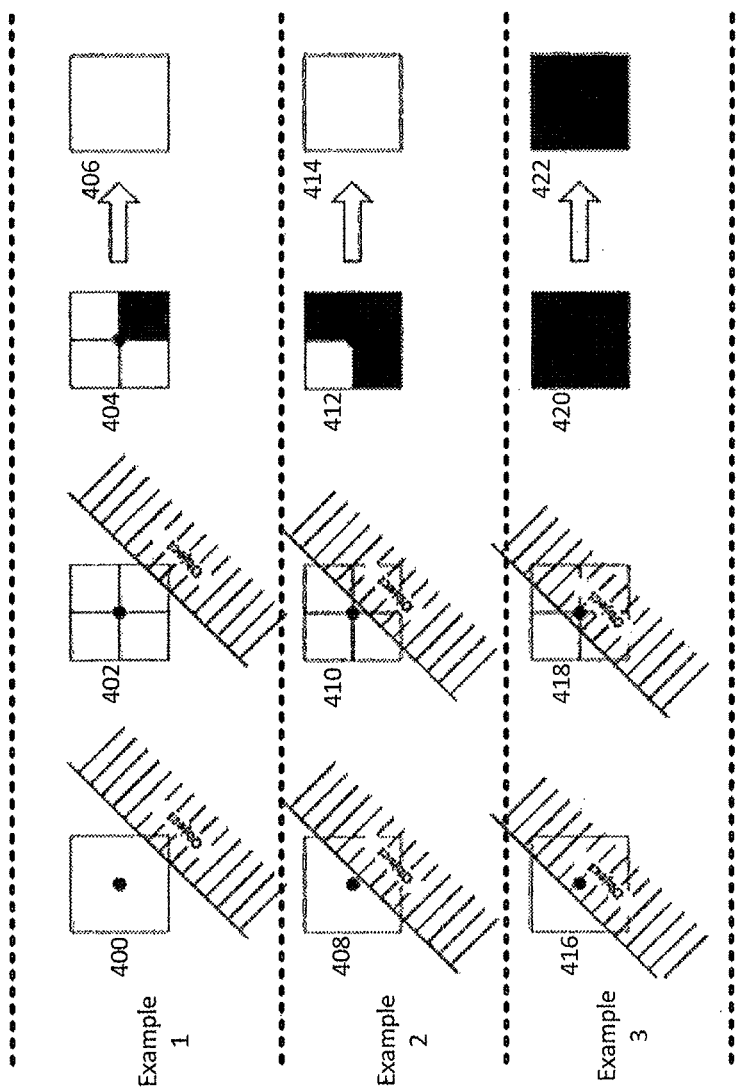
FIG. 4 shows a view of three examples producing center scan RIP output by using an over scan RIP technique at twice the resolution.

Thus, one aspect of the invention is aimed at producing a high quality center scan RIP output by using over scan RIP techniques. An exemplary embodiment includes a step of first oversampling the images using twice the intended output resolution in order to produce four sub-pixels corresponding to each output pixel. This oversampling is easily accomplished by a computer programmed to conduct a RIP using overscan techniques. Examples of RIPing at twice the regular resolution is shown in FIG. 4, in which three different examples are illustrated.

In the first example (Example 1), the original pixel 400 is sampled at twice the regular resolution to produce pixel 402 including four sub-pixels. When the object overlaps the lower right pixel, only the lower right pixel is filled in 404. When only the lower right pixel is illuminated, the exemplary algorithm determines that the object did not overlap the center of the pixel 400. Therefore, output pixel 406 is not filled.

In the second example (Example 2), the original pixel 408 is sampled at twice the regular resolution to produce pixel 410 including four sub-pixels. When the object overlaps the lower right pixel, lower left pixel and upper right pixel, these three pixels are filled in 412. When only these three pixels are filled, the exemplary algorithm determines that the object did not overlap the center of the pixel 412. Therefore, output pixel 414 is not filled.

In the third example (Example 3), the original pixel 416 is sampled at twice the regular resolution to produce pixel 418 including four sub-pixels. When the object overlaps a portion of all four pixels, these four pixels are filled in 420. When all four pixels are illuminated, the printer determines that the object did overlap the center of the pixel 418. Therefore, output pixel 422 is filled.

Essentially, the algorithm only fills the original pixel if the object is overlapping at least a portion of all four of the sub-pixels. By requiring the shape to overlap at least a portion of all four sub-pixels when performing the over scan RIP, the algorithm is essentially ensuring that the image shape includes the center of the overall original pixel (i.e., the dot of the original pixel is within the image object path). This process allows over scan RIP to produce a center scan RIP output.

It should be noted that although the examples provided herein are described with respect to RIPing at twice the resolution, the system could RIP at more than twice the resolution (e.g., three times, four times, five times, etc.). The resulting algorithm would be somewhat similar in nature, but would require the evaluation of more than just four sub-pixels to ensure that the over scan processing is still performing the appropriate center scan output. Accordingly, it is desirable to minimize the amount of oversampling to minimize the amount of processing power and memory needed to perform the algorithm.

Figure 5:
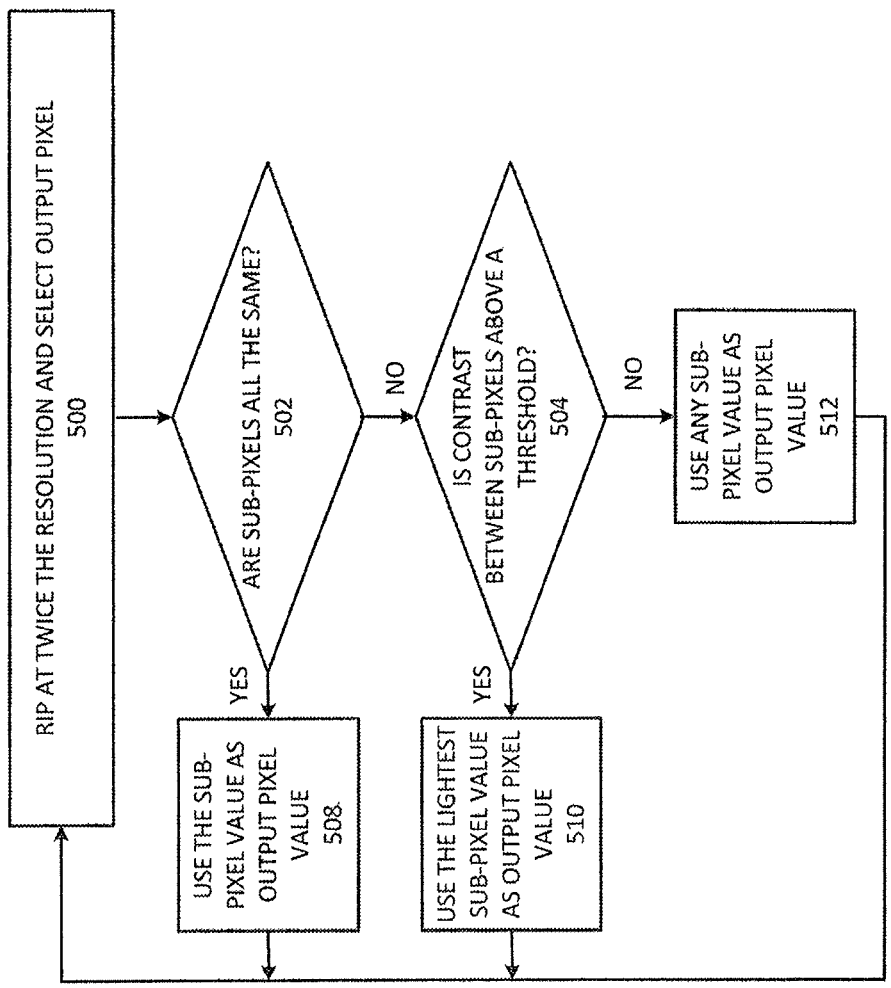
FIG. 5 shows a view of a flowchart for an algorithm for producing center scan RIP output by using an over scan RIP technique at twice the resolution.

A foundational algorithm for performing the over scan RIP and producing a center scan RIP output using the double resolution pixels is illustrated in the flowchart of FIG. 5. For example, in step 500 the system selects an output pixel resolution, and oversamples the image to include four sub-pixels for each output pixel. In step 502, the system determines if all of the sub-pixels have the same value (e.g. same grayscale value). If all the sub-pixels have the same value, then the system utilizes that value as the overall output pixel value in step 508 (e.g. the grayscale value of the sub-pixels is used as the output RIP pixel value). However, if all the sub-pixels do not have the same value (e.g. have different grayscale values), the system determines the contrast between the sub-pixels values. In step 504, the system determines if the contrast between the sub-pixels is above an intensity threshold. If the contrast is above a threshold, then the system utilizes the lightest (i.e. brightest) sub-pixel value as the overall output pixel value in step 510. If the contrast is not above this threshold value, then in step 512 the system utilizes any of the sub-pixel values (e.g., a random sub-pixel, top right sub-pixel, etc. as the output pixel value).

In order to enhance the foundational algorithm described in FIG. 5, Applicants' system also takes into consideration background values within the image (e.g., the grayscale value of the background). It should be noted that the background in the digital document may be consistent throughout, or may vary within the same document (i.e., there may not be background continuity throughout the document background). This is taken into consideration when determining the background value to enhance the foundational algorithm.

A benefit to determining and utilizing the background value in the image when performing RIP, is that the algorithm performs better when there are smaller features. This background utilization also avoids a "Halo Effect" arising from different separations making different sub-pixel selections.

Figure 6:
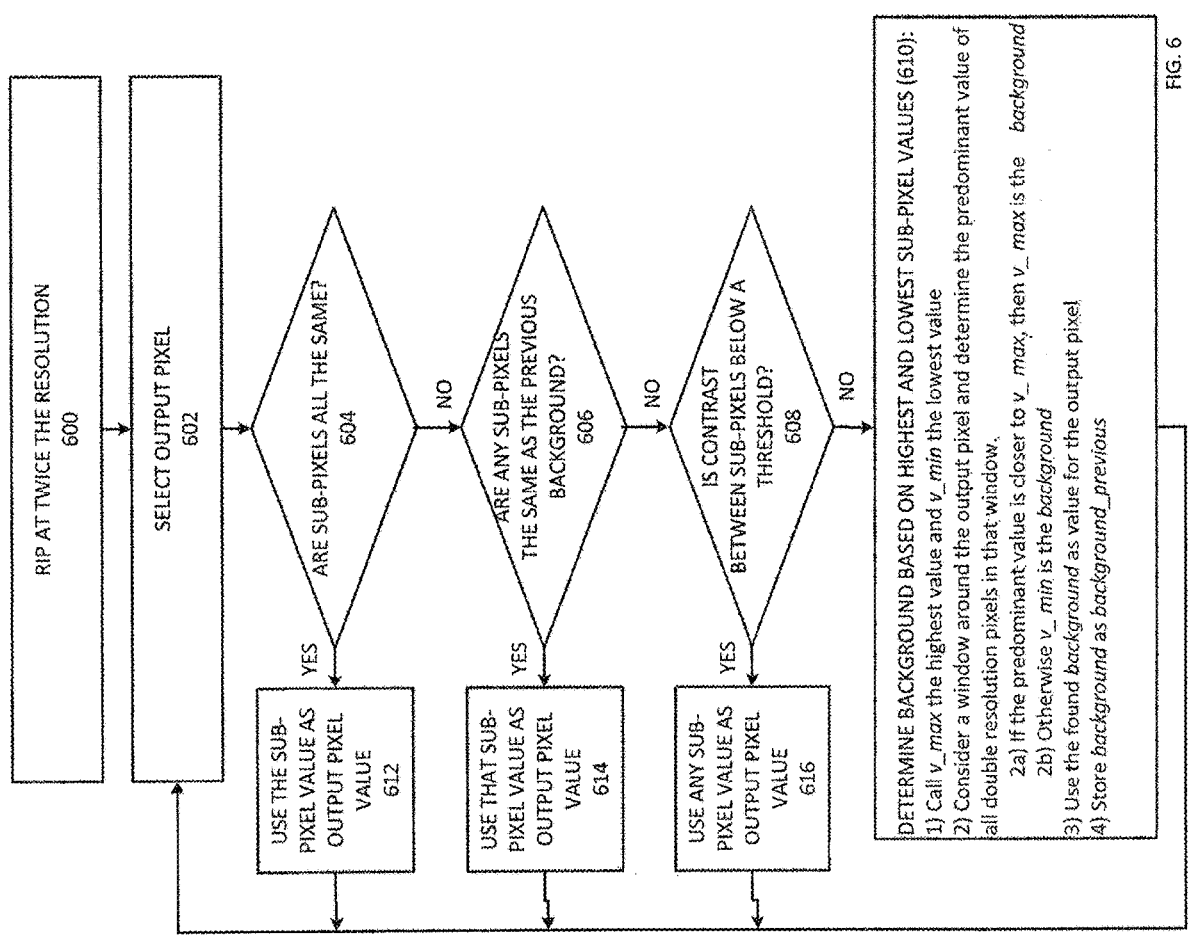
FIG. 6 shows a view of a flowchart for a background reliant algorithm for producing center scan RIP output by using an over scan RIP technique at twice the resolution.

An example of this background reliant algorithm is illustrated in the flowchart of FIG. 6. Similar to the foundational algorithm in FIG. 5, the system RIPs the image at twice the resolution in step 600. In step 602, the system then selects each output pixel (i.e. and included sub-pixels) as it scans through the image. In step 604, the system determines if all the sub-pixels in the selected pixel are the same. If all the sub-pixels are the same, then in step 612 the system utilizes that sub-pixel value as the output pixel value. However, if all the sub-pixels are not the same, then the system determines if any of the sub-pixels are the same as the previous background value in step 606. The previous background value may be initialized with any pixel value within the image and then updated accordingly as the system scans through the image. The background may be determined by consideration of a window of pixels surrounding the pixel being considered. For example, in FIG. 7, the pixel under consideration 702 has four included sub pixels, and the window 704 surrounding pixel 702 contains a total of 100 (10×10) pixels (400 subpixels). The window surrounding the pixel for use in determining the background may be of any size and shape.

Step 606 compares sub-pixels to determine if there are sub-pixels that are the same as a previous, stored background value, in which case that sub-pixel value is utilized as the output pixel value in step 614. If the sub-pixel values are not the same as the previous background value, then the system determines the contrast between the sub-pixels in step 608. If the contrast is below a threshold, then in step 616 one of the sub-pixel values, such as one chosen at random or a pre-designated sub-pixel (e.g. upper left sub-pixel) or a sub-pixel meeting any predetermined criteria (e.g. lowest value, highest value, mean value), is utilized as the output pixel value.

If the contrast is above the threshold, then the system moves to step 610 where an algorithm determines the background value based on the highest and lowest sub-pixel values. In order to update the background value, four basic steps are performed. In substep 1 of step 610, the maximum value v_max and minimum value v_min of the sub-pixel values are defined. In substep 2 of step 610, a predominant value of the double resolution pixels within the background window is determined (i.e., all the pixels in the background window are analyzed to determine the predominant value). If this predominant value is closer to the max value v_max, then v_max is utilized as the background value (substep 2a of step 610). If the predominant value is not closer to the v_max, then v_min is utilized as the background value (substep 2b of step 610). Finally, if a new background value is determined in substep 2, then this new background value is utilized to update the previous, stored background value (substep 4 of step 610) and is also utilized as the output pixel value (substep 3 of step 610).

By utilizing the enhanced background reliant algorithm in FIG. 6, the system is able to determine whether the output pixel is on the edge of an object (i.e., overlapping the object and/or the background value). This enhancement may be particularly useful for text images to ensure the best sub-pixel values are chosen to maximize clarity.

Figure 7:
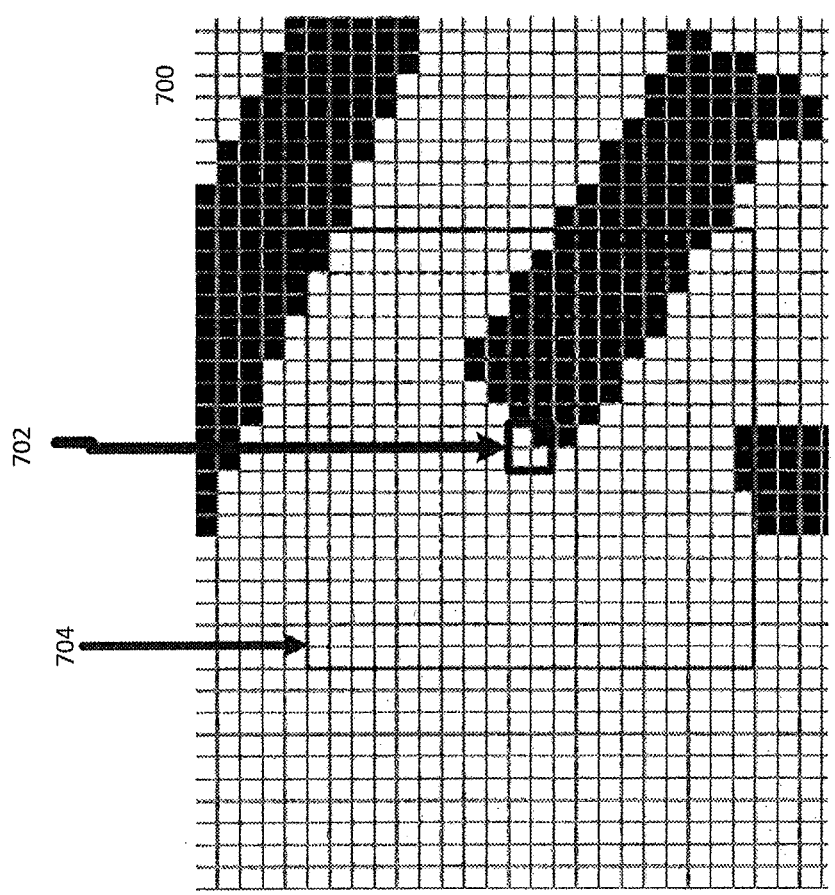
FIG. 7 shows a view of a pixel in a text file image relating to step 614 in the flowchart of FIG. 6.
Figure 8:
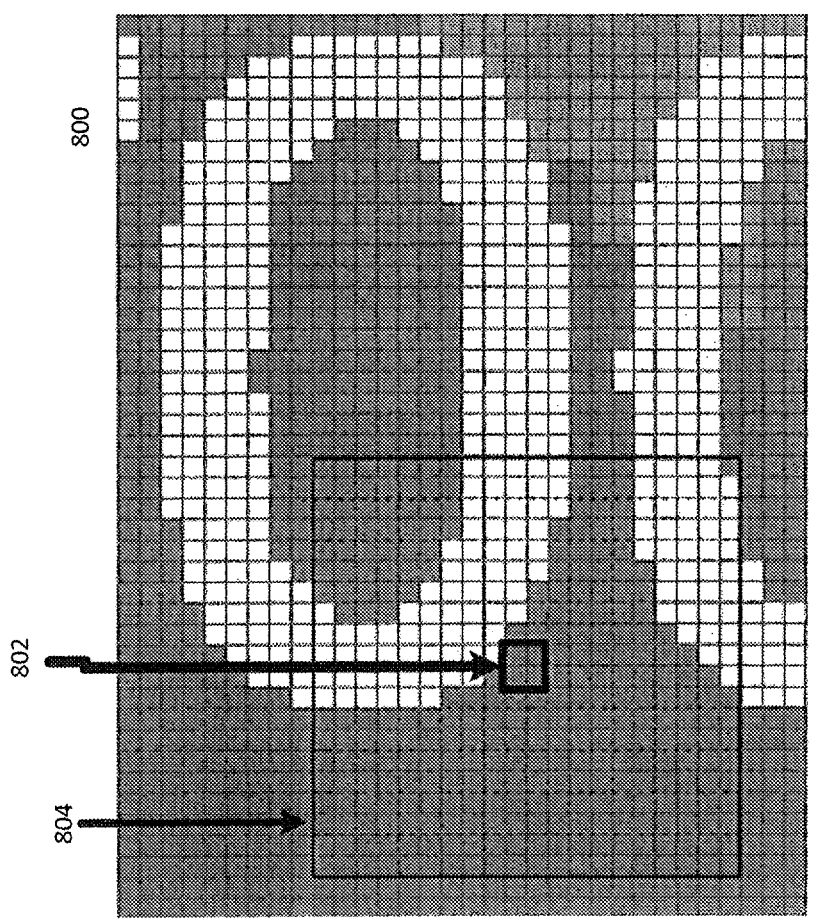
FIG. 8 shows a view of a pixel in a text file image relating to step 616 in the flowchart of FIG. 6.
Figure 9:
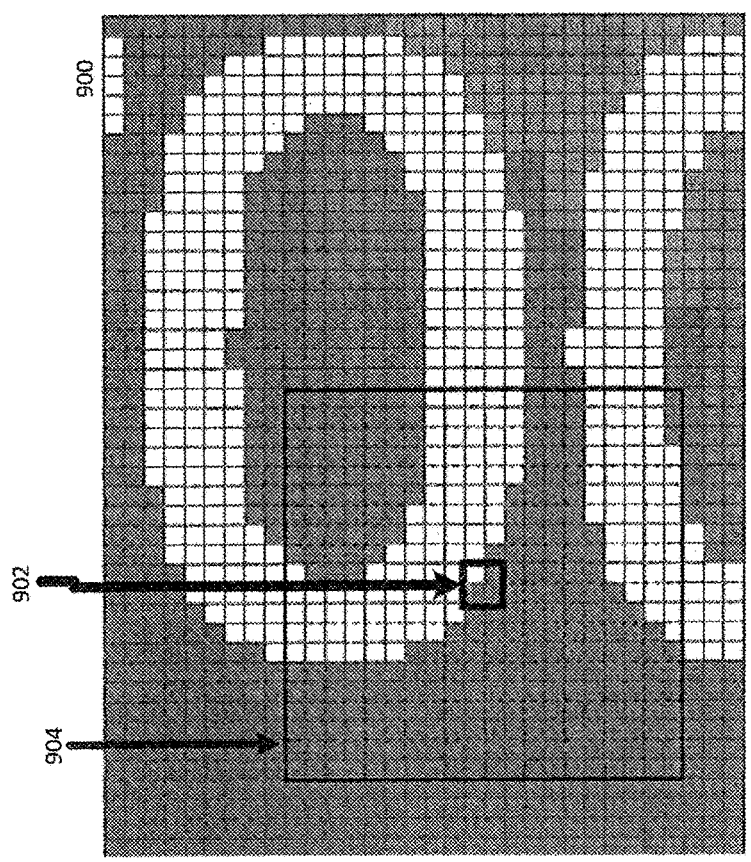
FIG. 9 shows a view of a pixel in a text file image relating to step 610 in the flowchart of FIG. 6.

The illustrations in FIGS. 7, 8 and 9 further illustrate steps 614, 616 and 610, discussed above. For example, in FIG. 7, a portion of an image 700 is shown with pixel 702 being evaluated. Pixel 702 includes four sub-pixels. Three out of the four sub-pixels are white (i.e., the same as the background), so the system uses that sub-pixel value (i.e., the background color) as the output pixel value.

In another example shown in FIG. 8, the portion of the image 800 includes a pixel 802 that is being evaluated. If all four sub-pixels within pixel 802 are the same in gray value, then that gray value is used as the output pixel value per steps 604 and 612. If all four sub-pixels within pixel 800 are not exactly the same gray value, but the contrast is below a defined threshold, any of the sub-pixel values (e.g. upper right sub-pixel) may be utilized as the output pixel value, as shown in steps 608 and 616.

In yet another example shown in FIG. 9, the portion of the image 900 includes pixel 902 that is being evaluated. If the variance in the gray values among the sub-pixels corresponds to a contrast above a set threshold, the algorithm identifies this contrast in step 608 and then performs step 610. For example, both the v_max and v_min within the pixel is determined. If the predominant value of the sub-pixels within the surrounding window 904 is closer to v_max, the v_max is set as the background value, or else v_min is set as the background value. Finally, the background value is used as the output pixel value and is also used to update the stored background value for the next iteration.

The size of the background window (e.g. 704, 804 and 904) is a parameter that can be set. Optimally, the size of the background window is about half the pixel size of the smallest features to be accommodated in the image. However, other sizes may be used for the size of the background window. For example, the size of the background window may be selected based on other features of the image, or other parameters or pre-determined criteria or strategies. So, for example, if the finest features in an image have a total area of approximately 200 output pixels, a background window of 100 output pixels (400 subpixels) may be chosen. Although shown as a square, the background window may be any shape, and may have a regular or irregular shape. For example, in an application in which resolution may be more important in a horizontal direction than in a vertical direction, the size of the window may be smaller in the vertical direction (e.g. a window that is 10 pixels on the horizontal and 5 pixels in the vertical). The geometry of the background window may also be related to the geometry of the output pixel.

As can be seen from the figures and described in the detailed description, Applicants' invention effectively harnesses over scan RIP functionality in combination with algorithmic processing to provide an output that is comparable to that achieved using center scan RIP techniques. The algorithmic steps include oversampling the image at twice or more the original resolution, and then analyzing sub-pixel values within the original pixel. Special deference is given to the background pixel values within the image to avoid unwanted artifacts. This algorithm is beneficial for many companies and customers that prefer the crisper image produced by performing center scan RIP, but are unable to perform center scan RIP because their devices are configured to only perform an over scan RIP.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. A raster image processing system comprising:
   a computer readable media storing digital information including:
   information corresponding to an image;
   instructions for performing raster image processing (RIP) using an over scan RIP technique on the image to generate an output bitmap; and
   a processor configured to:
   access the stored digital information to retrieve the information corresponding to the image and the instructions for performing the over scan RIP technique,
   RIP the image using the over scan RIP technique at an even multiple of the desired output pixel resolution to produce a set of sub-pixels per output pixel, the set consisting of a number of sub-pixels equal to the multiple squared, each sub-pixel having a value assigned by the over scan RIP technique,
   determine each respective output pixel value based on the sub-pixel values assigned for the set of sub-pixels corresponding to each image pixel, by first comparing the sub-pixel values in the set of sub-pixels to each other and, if that first comparison indicates further processing is necessary, secondly comparing the values of the set of sub-pixels to a set background value, and setting the respective output pixel value based upon that second comparison; and generate the output bitmap comprising the output image pixel values.

2. The raster image processing system of claim 1, further comprising a rastering device, wherein the processor is further configured to control the rastering device to create a rastered output based upon the generated output bitmap.

3. The raster image processing system of claim 2, wherein the rastering device comprises a printer or an imagesetter.

4. The system of claim 1,
wherein the processor is further configured to set the respective output pixel value to the sub-pixel value when all of the set of sub-pixels corresponding to the output pixel have the same value.

5. The system of claim 1,
wherein the processor is further configured to set the respective output pixel value to a specific one of the sub-pixel values in the set of sub-pixels corresponding to the output pixel when the specific sub-pixel has a same value as the set background value.

6. The system of claim 1,
wherein the processor is further configured to set the respective output pixel value to any one of the sub-pixel values in the set of sub-pixels corresponding to the output pixel when contrast among the sub-pixel values in the set of sub-pixels corresponding to the output pixel is below a threshold.

7. The system of claim 1,
wherein the processor is further configured to set the background value and set the respective output pixel value by:
a) setting v_max as a highest sub-pixel value and v_min as a lowest sub-pixel value of the set of sub-pixels corresponding to the output pixel,
b) considering a window around the output pixel and determining a predominant value of all sub-pixels in that window,
c) setting v_max as the background value if a predominant sub-pixel value is closer to v_max, else setting v_min as the background value, and
d) setting the respective output pixel value to the background value as set in (c).

8. The system of claim 7,
wherein the print controller is further configured to set a size of the background window to a predetermined number of pixels based upon a size in pixels of the smallest features present in the image.

9. The system of claim 8, wherein the predetermined pixel size of the background window is half the size in pixels of the smallest features present in the image.

10. The system of claim 1,
wherein the processor is further configured to update the set background value during the RIP of the image using the over scan RIP technique.

11. The system of claim 1, wherein each set of sub-pixels consists of four subpixels.

12. The raster image processing system of claim 1, wherein the processor is configured to:
determine each respective output pixel value based on the sub-pixel values assigned for the set of sub-pixels corresponding to each output pixel by first comparing the sub-pixel values in the set of sub-pixels to each other and to an initial background value and to set the respective output pixel value based upon that first comparison if that first comparison indicates no further processing is necessary,
but if that first comparison indicates further processing is necessary, to secondly compare the sub-pixel values in the set of -sub-pixels to an updated background value based upon a predominant sub-pixel value in a background window around the output pixel, and to set the respective output pixel value based upon that second comparison.

13. The raster image processing system of claim 1, wherein the output bitmap created using the over scan RIP technique is equivalent to an output bitmap generated by a center scan image technique on the same image.

14. A raster image processing method, the method comprising the steps of:
accessing, by a processor, digital information stored on a computer readable media to retrieve information corresponding to an image and instructions for performing raster image processing (RIP) using an over scan RIP technique on the image to generate an output bitmap,
RIPing, by the processor, the image using the over scan RIP technique at an even multiple of the desired output pixel resolution to produce a set of sub-pixels per output pixel, the set of sub-pixels consisting of a number of sub-pixels equal to the multiple squared, each sub-pixel in the set of sub-pixels having a sub-pixel value assigned by the over scan RIP technique,
determining, by the processor, a respective output pixel value based on the sub-pixel values assigned for the set of sub-pixels corresponding to each image pixel, by firstly comparing the sub-pixel values in the set of sub-pixels to each other and, if that first comparison indicates further processing is necessary, secondly comparing the sub-pixels values in the set of sub-pixels to a set background value, and setting the output pixel value based upon that second comparison; and
generating, by the processor, the bitmap comprising the respective output image pixel values.

15. The raster image processing method of claim 14, further comprising:
controlling, by the processor, a rastering device to create a rastered output based upon the generated bitmap.

16. The raster image processing method of claim 15, wherein the rastering device comprises a printer, an imagesetter, or a digital press.

17. The raster image processing method of claim 14, further comprising:
assigning, by the processor, the respective output pixel value to the sub-pixel value when all of the sub-pixel values within the set of sub-pixels corresponding to the output pixel have the same value.

18. The raster image processing method of claim 14, further comprising:
assigning, by the processor, the respective output pixel value to a specific one of the sub-pixel values within the set of sub-pixels corresponding to the output pixel, when the specific sub-pixel has a same value as the set background value.

19. The raster image processing method of claim 14, further comprising:
assigning, by the processor, the respective output pixel value to any one of the sub-pixel values within the set of sub-pixels corresponding to the output pixel when contrast among the sub-pixel values in the set is below a threshold.

20. The raster image processing method of claim 14, further comprising:
   setting, by the processor, the background value and assigning the output pixel value by:
   a) setting v_max as a highest sub-pixel value and v_min as a lowest sub-pixel value in the set of sub-pixels corresponding to the output pixel,
   b) considering a background window around the output pixel and determining the predominant value of all sub-pixels in that window,
   c) setting v_max as the background value if the predominant value is closer to v_max, else setting v_min as the background value, and
   d) setting the respective output pixel value to the background value as set in (c).

21. The raster image processing method of claim 20, further comprising:
   setting, by the processor, a size of the background window to a predetermined number of pixels based upon a size in pixels of the smallest features present in the image.

22. The raster image processing method of claim 21, wherein the predetermined pixel size of the window is half the size in pixels of the smallest features present in the image.

23. The raster image processing method of claim 14, further comprising:
   updating, by the processor, the set background value during over scan RIP of the image.

24. The raster image processing method of claim 14, wherein each set of sub-pixels consists of four subpixels.

25. The raster image processing method of claim 14, wherein the step of determining each respective output pixel value comprises:
   determining, by the processor, each respective output pixel value based on the sub-pixel values assigned for the set of sub-pixels corresponding to each output pixel, by first comparing the sub-pixel values in the set of sub-pixels to each other and to an initial background value, and setting the respective output pixel value based upon that first comparison if that first comparison indicates no further processing is necessary,
   but if that first comparison indicates further processing is necessary, to secondly compare the sub-pixel values in the set of sub-pixels to an updated background value based upon a predominant sub-pixel value in a background window around the output pixel, and setting the respective output pixel value based upon that second comparison.

26. The raster image processing method of claim 14, wherein the output bitmap created using the over scan RIP technique is equivalent to an output bitmap generated by a center scan image technique on the same image.

* * * * *